United States Patent [19]
Tracy

[11] Patent Number: 5,975,610
[45] Date of Patent: Nov. 2, 1999

[54] SEATING APPARATUS FOR A TAILGATE

[76] Inventor: Mark Alan Tracy, 18747 San Felipe, Fountain Valley, Calif. 92708

[21] Appl. No.: 09/129,597

[22] Filed: Aug. 5, 1998

[51] Int. Cl.[6] ........................................................ B60N 2/00
[52] U.S. Cl. ................................ 296/63; 296/57.1; 296/69
[58] Field of Search ................................ 296/57.1, 63, 69

[56] References Cited

U.S. PATENT DOCUMENTS

| | | |
|---|---|---|
| 324,196 | 8/1885 | Walling . |
| 2,702,076 | 2/1955 | Beardsley et al. ........................ 297/252 |
| 3,821,825 | 7/1974 | Bailey .................................. 297/252 X |
| 4,125,284 | 11/1978 | Hicks et al. . |
| 4,846,487 | 7/1989 | Criley .................................... 296/62 X |
| 5,000,504 | 3/1991 | Munguia ............................. 296/57.1 X |
| 5,039,154 | 8/1991 | Lewis . |
| 5,312,150 | 5/1994 | Quam .................................. 296/57.1 X |
| 5,352,008 | 10/1994 | Denvir . |
| 5,533,774 | 7/1996 | Cavanaugh . |
| 5,722,714 | 3/1998 | Vallerand ............................ 296/57.1 X |
| 5,735,567 | 4/1998 | Mora, Sr. ............................ 296/57.1 X |
| 5,788,311 | 8/1998 | Tibbals ...................................... 296/62 |

*Primary Examiner*—Joseph D. Pape
*Attorney, Agent, or Firm*—Gene Scott-Patent Law & Venture Group

[57] ABSTRACT

A seat and backrest is provided for mounting onto a vehicle's tailgate and which moves with the tailgate without obstructing the tailgate's motion. The seat and backrest may be easily removed from the tailgate and later replaced, so as to enable the vehicle to be used without the invention acting as an obstruction to loading and unloading the vehicle. A hinged cover panel is incorporated for providing a table surface and a cover for the seating surface.

4 Claims, 2 Drawing Sheets

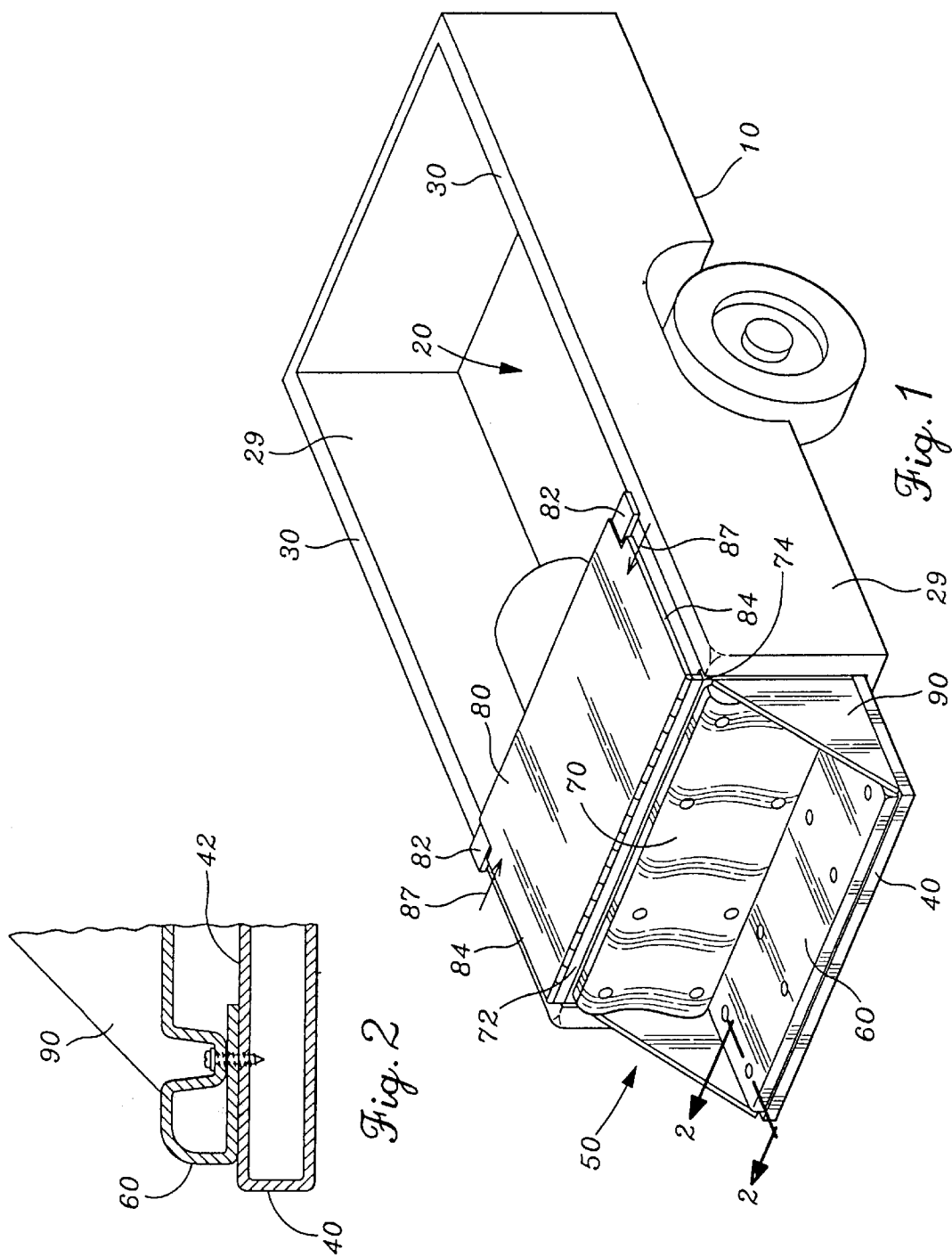

5,975,610

SEATING APPARATUS FOR A TAILGATE

BACKGROUND OF THE INVENTION

1. Field of the Invention

This invention relates generally to vehicle seating, and more particularly to a seat apparatus make as a part of or in combination with a vehicle tailgate.

2. Description of Related Art

The following art defines the present state of this field:

Lewis, U.S. Pat. No. 5,039,154 describes a mounting system for a conventional tailgate of a pick-up truck that is capable of situating the tailgate so as to minimize drag and at the same time provide effective use of the tailgate. Two mounting brackets are each structured to include a base for being mounted upon the top tend of a respective sidewall of a pick-up truck cargo bed. Each of the mounting brackets is further structured with a particular fitting for interfacing with reciprocably shaped fittings on the tailgate to removably secure, in a selectively lockable manner, the tailgate to the fittings, in the same manner that the tailgate conventionally attaches to the conventional fittings located at the inside wall of the sidewalls of the pick-up truck.

Denvir, U.S. Pat. No. 5,352,008 describes a tailgate plate that is arranged for displacement from a vertical position extending over an entrance opening of a vehicular truck bed, wherein the tailgate is arranged for displacement to a second position orthogonally and forwardly oriented relative to the first position permitting access of air movement through the entrance opening of the truck bed to improve aerodynamics and increase the fuel efficiency of the truck, and wherein the tailgate is arranged for displacement to a third position orthogonally and rearwardly oriented relative to the first position and in the same plane as the truck bed floor, allowing cargo to be loaded and unloaded in the accustomed manner.

Hicks, U.S. Pat. No. 4,125,284 describes a self-propelled vehicle for transporting personnel and/or small cargoes including a seat for the driver and a cargo-carrying bed or floor located rearwardly of the seat. The floor includes a stationary, generally flat first platform and a movable section including a generally flat second platform and a rear wall member extending generally perpendicular to the second platform. The movable floor section is supported from the rear portion of the vehicle frame for selective pivotal movement between a raised or cargo-carrying position where the second platform is generally coplanar with the first platform and the rear wall member serves to confine cargo on the floor and a lowered or passenger-carrying position where the rear wall member can serve as a step for a passenger to step up and sit on the stationary platform and also serve as a foot rest for a rearward-facing passenger(s) sitting on the stationary platform. The movable floor section is releasably held in the raised position by a pair of laterally spaced arms, each of which, at the outer end, is pivotally supported from the movable floor section and, at the inner end, is provided with a detent notch which is biased into releasable engagement with a pin located on the vehicle frame beneath the stationary platform by a spring connected between the inner end of the arm and the vehicle frame.

Cavanaugh, U.S. Pat. No. 5,533,774 describes a seat for supporting an individual relative to an exterior panel of the vehicle. The inventive device includes a seat assembly pivotably mounted within an aperture in an exterior body panel of a vehicle. A latch assembly retains the seat assembly within the body panel and can be selectively actuated to permit releasing of the seat assembly into a horizontal position, whereby an individual can be supported relative to the vehicle exterior.

The prior art does not teach a tailgate seating apparatus of the type shown herein. The prior art, in Cavanaugh does teach a panel seat for a truck. However, the prior art does not teach that a seating apparatus may be made integral with a tailgate to provide the improvements taught in the present disclosure and having the related advantages as described in the following summary.

SUMMARY OF THE INVENTION

The present invention teaches certain benefits in construction and use which give rise to the objectives described below.

The present invention provides a seat and backrest which may be mounted onto a vehicle's tailgate and which moves with the tailgate without obstructing the tailgate's motion. Preferably, the seat and backrest may be easily removed from the tailgate and later replaced, so as to enable the vehicle to be used without the invention acting as an obstruction to loading and unloading the vehicle. A hinged cover panel may be incorporated with the invention so as to provide a table surface and a cover for the seating surface.

A primary objective of the present invention is to provide a tailgate seating apparatus having advantages not taught by the prior art.

Another objective is to provide such an apparatus that is of simple yet strong in construction so as to be durable in use and easily mounted so as to be removable when not needed.

A further objective is to provide such an apparatus that is able to use the rotational feature of the tailgate so as to be folded into the bed of the vehicle when not in use.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of the preferred embodiment of the present invention;

FIG. 2 is a partial sectional elevational view thereof taken along cutting plane 2—2 in FIG. 1.

DETAILED DESCRIPTION OF THE INVENTION

Figure 3:
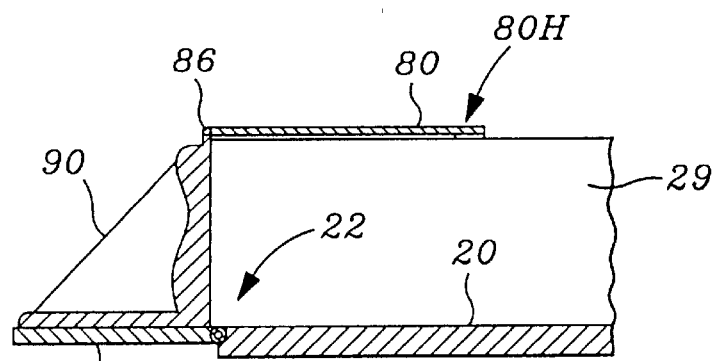
FIGS. 3–6 are a series of partial side elevational mechanical schematic views thereof showing only the rear portion of the invention in several hingably rotational positions depicting the use of the invention, as in FIG. 3 for sitting and use of a table surface, FIG. 4, rotated outboard of the vehicle bed for improved cargo carrying space within the cargo bed, FIG. 5, rotated outboard with the cover panel used as a wind break or aerodynamic element within the vehicle's bed, and FIG. 6 with the tailgate closed and the apparatus stowed and covered.

The above described drawing figures illustrate the invention, a combination cargo vehicle and tailgate seating apparatus comprising a cargo vehicle 10 such as a truck or a trailer, providing a cargo bed 20, which is typically a horizontal platform with structural reinforcement for carrying a load, the cargo bed being partially enclosed by a fixed sidewall 29, as clearly shown in FIG. 1, and further providing a tailgate 40, the tailgate being hingably attached to the vehicle 10 at a tail end 22 (FIG. 3) of the cargo bed 20, the tailgate 40 being positionable in a vertical attitude 40V (FIG. 6) for further enclosing the cargo bed 20, and alternatively in a horizontal attitude 40H (FIG. 5) for providing improved access to the cargo bed 20. Please note hinge 42 which attaches the tailgate 40 rotationally to the cargo bed 20. Such a relationship is well known in the truck industry so that further details of its construction and operation are not necessary here.

The invention further includes a tailgate seating apparatus 50, best shown in FIG. 1, providing a seating means 60, which is preferably of a molded plastic construction such as shown in the partial sectional view in FIG. 2, fixed to and mainly covering an upwardly facing surface 42 of the tailgate 40 when the tailgate is positioned in the horizontal attitude 40H. The seating means 60 may be fixed to the tailgate by screws, as shown in FIG. 2, or by other fastener methods well known in the art and may be constructed so as to be easily removed when necessary. The seating apparatus 50 further provides a backrest means 70 fixed to the tailgate 40 and also to the seating means 60 and is preferably an integrally molded part with the seating means 60 and of the same type of plastic sheet molded construction as shown in FIG. 2. A structural back panel 74 may be provided to provide improved rigidity and support to the backrest means 70. The backrest means 70 is preferably oriented in an approximately vertical attitude 70V (FIG. 4) adjacent to the tail end 22 of the cargo bed 20 when the tailgate 40 is positioned in the horizontal attitude 40H, the backrest means 70 rotating to a horizontal position 70H (FIG. 6) adjacent to, or in contact with the cargo bed 20, when the tailgate 40 is rotated into the tailgate vertical attitude 40V. The seating apparatus 50 may be covered with a soft and compliant material such as foam rubber so as to provide any level of comfort and luxury desired.

Figure 4:
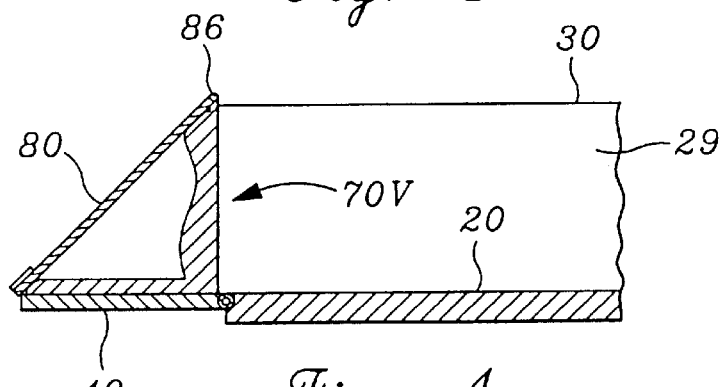
Figure 5:
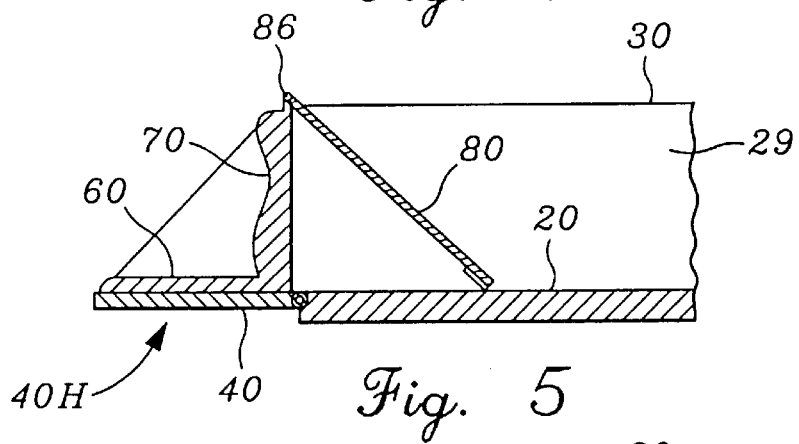
Figure 6:
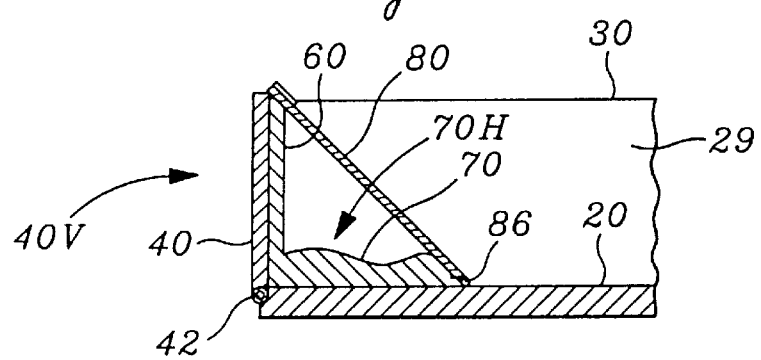

The invention preferably, but not necessarily, further includes a cover panel 80 of rigid construction, the cover panel being hingably interconnected (hinge 86) to the backrest means 70 along an upper edge 72 thereof so as to be rotationally positionable for covering the backrest means 70 and the seating means 60, as shown in FIGS. 4 and 6, and alternately rotationally positionable for laying within the cargo bed 20 when the tailgate 40 is in the horizontal attitude 40H, as shown in FIG. 5. When the cover panel 80 is positioned as shown in FIG. 5 it acts to improve the aerodynamics of the vehicle.

Preferably, the cover panel 80 further provides a locking means 82 operable for supporting the cover panel in a horizontal attitude 80H (FIG. 3) braced by the fixed sidewall 29, when the tailgate 40 is in the horizontal attitude 40H. In this position, the cover panel 80 may be used as a table surface to hold picnic foods, plates and other items. The locking means 82 preferably comprises a pair of sliding latches as best shown in FIG. 1, one of the latches being positioned on each of two opposing sides 84 of the cover panel, the sliding latches being positionable in a retracted position (not shown, but indicated by the arrows 86 in FIG. 1, so as to enable rotating of the cover panel 80 into the cargo bed 20 of the vehicle as shown in FIG. 5, and, alternately, into an extended position, as shown in FIG. 1, for resting the cover panel 80 in the horizontal attitude 80H with the latches resting on an upper edge 30 of the fixed sidewall 29 of the vehicle.

Preferably, the tailgate seating apparatus further comprises a pair of laterally displaced side support panels 90, the side support panels interconnecting the backrest means 70, and, or the support panel 74 with the seating means 60 so as to establish a rigid relationship therebetween.

As previously indicated, the invention is compactly stored when not in use, as shown in FIG. 6, whereby the cover panel 80 helps break the wind when the vehicle 10 is in motion. When the invention is used for its intended purpose, it is rotated with the tailgate 40 to the horizontal position 40H as shown in FIGS. 1–5. In this position the invention provides convenient and comfortable seating for several individuals, and provides a table surface for eating, games and other activities.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination cargo vehicle and tailgate seating apparatus comprising:

a cargo vehicle including a cargo bed partially surrounded by a fixed sidewall, and further including a tailgate, the tailgate being hingably attached to the vehicle at a tail end of the cargo bed, the tailgate being rotatable to a vertical attitude for further enclosing the cargo bed, and alternatively rotatable to a horizontal attitude, in planar coincidence with the cargo bed, for including improved access to the cargo bed;

a tailgate seating apparatus providing a seating means fixed to, and mainly covering an upwardly facing surface of the tailgate when the tailgate is positioned in the horizontal attitude, and further including a backrest means fixed to the tailgate and extending in an approximately vertical attitude adjacent to the tail end of the cargo bed when the tailgate is positioned in the horizontal attitude, the backrest means rotating to a horizontal position adjacent to the cargo bed when the tailgate is rotated into the vertical attitude;

and a cover panel of rigid construction, the cover panel being hingably interconnected with the backrest means along an upper edge thereof so as to be rotationally positionable for covering the backrest means and the seating means, and alternately rotationally positionable for laying within the cargo bed when the tailgate is in the horizontal attitude.

2. The combination of claim 1 wherein the cover panel further provides a locking means operable for supporting the cover panel in a horizontal attitude braced by the fixed sidewall, when the tailgate is in the horizontal attitude.

3. The combination of claim 2 wherein the locking means comprises a pair of sliding latches, one of the latches being positioned on each of two opposing sides of the cover panel, the sliding latches being positionable in a retracted position for rotating the cover panel into the cargo bed of the vehicle, and, alternately, into an extended position for supporting the cover panel in the horizontal attitude with the latches resting on an upper edge of the fixed sidewall of the vehicle.

4. The combination of claim 1 wherein the tailgate seating apparatus further comprises a pair of laterally displaced side support panels, the side support panels interconnecting the backrest means with the seating means so as to establish a rigid relationship therebetween.

* * * * *